United States Patent [19]

Hunt

[11] Patent Number: 5,281,444
[45] Date of Patent: Jan. 25, 1994

[54] ISOPHORONE-FREE FLUOROCARBON COATING COMPOSITION

[75] Inventor: Robin L. Hunt, Pittsburgh, Pa.

[73] Assignee: PPG Industries, Inc., Pittsburgh, Pa.

[21] Appl. No.: 815,798

[22] Filed: Jan. 2, 1992

[51] Int. Cl.$^5$ ................................ B05D 1/26
[52] U.S. Cl. ..................... 427/428; 427/177; 427/359; 427/384; 106/14.27; 525/104
[58] Field of Search ............... 427/428, 177; 106/14.27; 525/104

[56] References Cited

U.S. PATENT DOCUMENTS

| | | |
|---|---|---|
| 3,697,298 | 10/1972 | Hastings et al. . |
| 3,753,942 | 8/1973 | Moran et al. . |
| 3,859,120 | 1/1975 | Schramm .................. 52/309.13 |
| 3,904,575 | 9/1975 | Satokawa et al. . |
| 3,944,689 | 3/1976 | Luckock et al. . |
| 3,955,017 | 5/1976 | Colebourne et al. ............ 427/428 |
| 4,015,057 | 3/1977 | Gall . |
| 4,120,810 | 10/1978 | Palmer . |
| 4,169,117 | 9/1979 | Vasta .................... 427/375 |
| 4,309,328 | 1/1982 | Carson et al. . |
| 4,314,004 | 2/1982 | Stoneberg . |
| 4,458,399 | 7/1984 | Kessler ................... 427/428 |
| 4,659,768 | 4/1987 | Tortorello et al. . |
| 4,690,968 | 9/1987 | Mitani et al. . |
| 4,824,728 | 4/1989 | Parsons et al. . |
| 4,879,345 | 11/1989 | Connelly et al. . |
| 5,122,396 | 6/1992 | Rantanen ................... 427/362 |

FOREIGN PATENT DOCUMENTS

| | | |
|---|---|---|
| 3-34783 | 5/1991 | Japan . |
| 2192399 | 1/1988 | United Kingdom . |

OTHER PUBLICATIONS

"Solubility Parameters," Kirk-Othmer Encyclopedia of Chemical Technology, 2nd. Ed., John Wiley & Sons, N.Y., (H. Mark McKetta & D. Othmer, Eds.) Supplemental Volume, pp. 889-910 (1971).

Primary Examiner—Anthony McFarlane
Attorney, Agent, or Firm—Dennis G. Millman

[57] ABSTRACT

A coating composition containing fluoropolymer adapted for roll coating is provided with a solvent system that is free of isophorone. The solvent system comprises an ester of an aromatic acid, a high molecular weight ketone, a high molecular weight alcohol, a glycol ether ester, and a hydrocarbon solvent having a high evaporation rate.

16 Claims, 1 Drawing Sheet

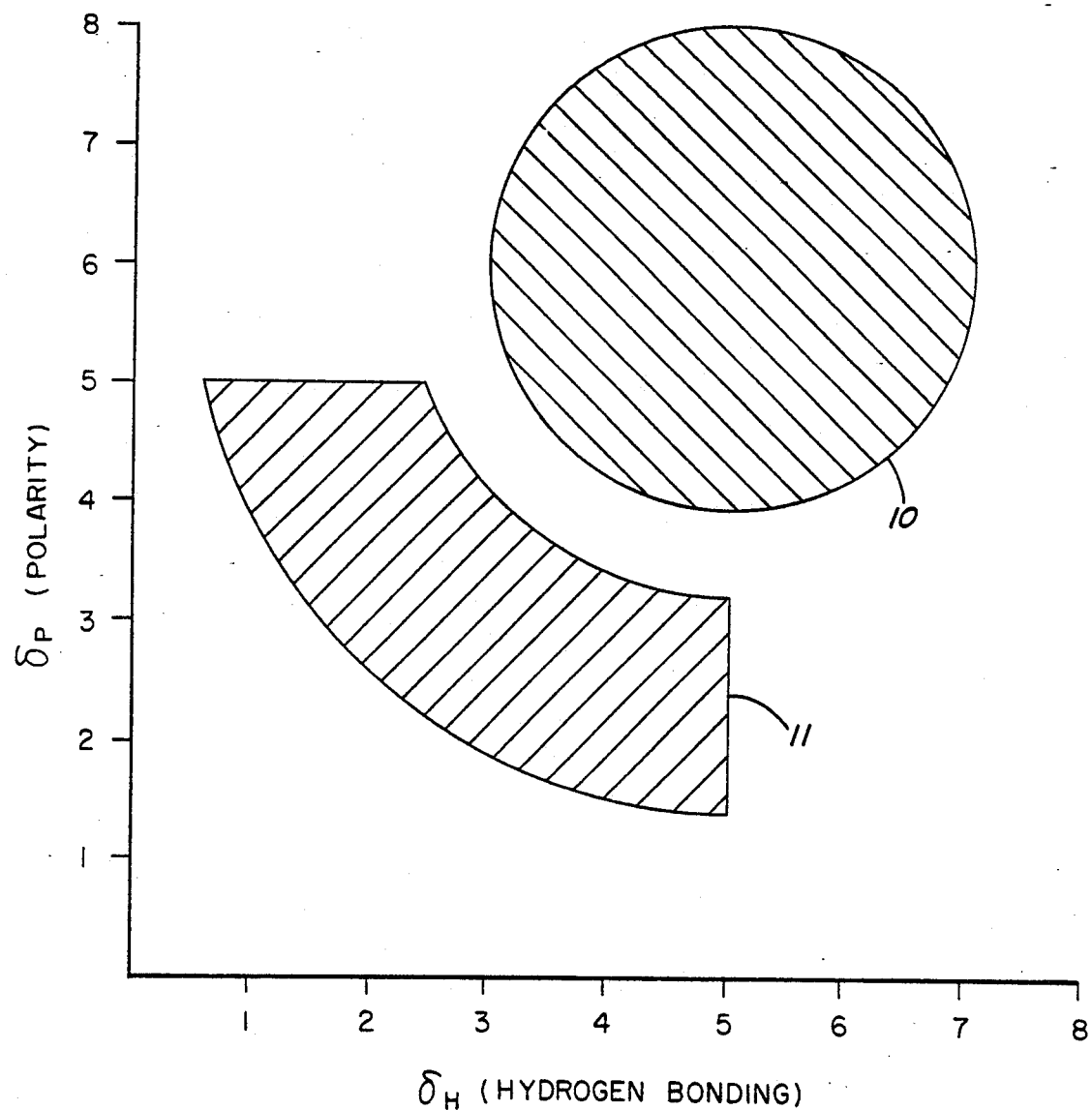

ical, the fluorocarbon polymer is present in this type of coating in amounts of about 45 to 85 percent by weight of the resin component, and the acrylic polymer may be present in amounts of about 15 to 55 percent by weight of the resin component. The use of isophorone is avoided by using instead a solvent component comprising a combination of selected solvents. The solvent component comprises an ester of an aromatic acid, a ketone, an alcohol, a glycol ether ester, and a hydrocarbon. The solvent is also essentially free of cyclohexanone. Expressed in terms of weight basis of the solvent component, the novel solvent system of the invention comprises: 5 to 15 percent of an ester of an aromatic acid, 10 to 20 percent of a ketone having a molecular weight greater than 100, 15 to 30 percent of an alcohol having a molecular weight greater than 120, 20 to 35 percent of an glycol ether ester having an evaporation rate less than 30, and 5 to 10 percent of a hydrocarbon solvent having an evaporation rate greater than 100.

ISOPHORONE-FREE FLUOROCARBON COATING COMPOSITION

BACKGROUND OF THE INVENTION

The present invention relates to coating compositions containing fluorocarbon resins, more specifically to such resins that are adapted for application by roll coating techniques and which need not include isophorone as a solvent.

The exceptional durability of coatings containing fluorocarbon resins has been long known, and such coatings have found wide use for exterior applications such as for architectural building components, e.g., aluminum extrusions and building panels. Examples of this type of coating are disclosed in U.S. Pat. No. 4,314,004 (Stoneberg).

Fluorocarbon containing coating compositions of this type are typically applied by either spraying or roll coating. Because of the divergent viscosity properties desired for these two application methods (compositions for spraying are preferably thixotropic, whereas compositions for roll coating are preferably newtonian), different solvent systems have been developed. For roll coating applications, fluorocarbon coating compositions conventionally contained substantial amounts of isophorone as a solvent. Compositions formulated for spraying are also characterized by higher evaporation rates than desired for roll coating (evaporation rate less than 70). Isophorone was considered unique in its ability to provide a combination of properties required for roll coating these compositions, including relatively low solvency at room temperature, better solvency at elevated temperatures for the sake of coalescing the resin particles, moderate evaporation rate, and appropriate surface tension and viscosity properties. However, eliminating isophorone solvent from fluorocarbon coatings is now considered a desirable objective due to the toxicity and objectionable odor of isophorone.

Coating compositions based on fluorocarbon resins without isophorone have been disclosed in the prior art, but these compositions are either not intended for roll coating applications or fall short of providing the desired combination of properties for roll coating. In U.S. Pat. No. 4,824,728 (Parsons) a list of solvents for the disclosed fluorocarbon containing coating composition does not include isophorone, and the composition is stated generally as being capable of application by spraying or roll coating. However, all of the examples in that patent are directed to sprayable coatings only, and the gist of the disclosure throughout the patent is to provide formulations that have characteristics of sprayable coatings (thixotropic rheology, evaporation rates higher than 70).

Japanese Kokoku 3-34783 (1991) (Kansai Paint K.K.) discloses that cyclohexanone may be substituted for isophorone as a solvent in a fluorocarbon containing coating composition. However, cyclohexanone is also an environmentally undesirable solvent and has an objectionable odor. Therefore, it would be desirable to avoid cyclohexanone as well.

SUMMARY OF THE INVENTION

The present invention provides an isophorone-free solvent system for a coating composition adapted for roll coating having a resin component comprising a fluorocarbon polymer such as polyvinylidene fluoride and a modifying resin such as an acrylic polymer. Typi- Alternatively, the solvent combination may be characterized as having the constituents proportioned so as to exhibit a solubility parameter from 2.5 to 4.5 (calories/cubic centimeter)$^{\frac{1}{2}}$ (hereinafter termed "solubility parameter units"), preferably 2.5 to 4.25 solubility parameter units, from the solubility parameter center of the fluorocarbon polymer, with the solubility parameter of the solvent combination further having a hydrogen bonding component less than 5 and a polarity component less than 5. This is based on the fluorocarbon polymer having a range of solubility of two solubility parameter units about a solubility parameter center defined by a hydrogen bonding component of 4.5 to 5.5 and a polarity component of 5.5 to 6.5. Some embodiments may additionally be characterized as having an evaporation rate less than 70.

The invention also encompasses methods of roll coating using coating compositions having the novel solvent combination described herein.

THE DRAWING

The drawing is a Hansen solubility parameter diagram showing an example of a solubility parameter range for a typical fluorocarbon polymer and the solubility parameter region of interest for the solvent combination of the present invention. The units of the diagram are (calories/cubic centimeter)$^{\frac{1}{2}}$.

DETAILED DESCRIPTION

A particular type of coating composition for which the present invention may be considered an improvement is that disclosed in U.S. Pat. No. 4,314,004 (Stoneberg), the disclosure of which is hereby incorporated by reference. These coatings are characterized by a resin component comprising about 45 to about 85 percent (based on weight of the resin solids) of a fluorocarbon resin, preferably 65 to 75 percent fluorocarbon resin, and from about 15 to about 55 percent (preferably 25 to 35 percent) of a modifying resin, preferably an acrylic resin. Other modifying resins which may be used instead of or in addition to the acrylic resin include polyester resins and epoxide resins as are known in the art. Coatings of this type may be applied directly to a substrate or, particularly in the case of metal substrates, applied over a primer. A clear top coat may be applied over the pigmented coating, the clear top coat having substantially the same resin composition as the pigmented coat. The solvent component of U.S. Pat. No.

4,314,004 is adapted for spray application. A different solvent system is required for roll coating compositions in accordance with the present invention.

A requirement for the solvent combination of the present invention is that none of the solvents should appreciably solubilize the fluorocarbon polymer at application temperatures so as to avoid premature coalescing of the fluorocarbon. The objective is to disperse rather than dissolve the fluorocarbon under application conditions. Isophorone was chosen for use in prior art roll coating fluorocarbon compositions for this property. On the other hand, the solvents should be relatively good solvents for the modifying resin (e.g., an acrylic) that is present in the composition. Referring to the solubility parameter diagram shown in the drawing, the circle 10 represents the region of solubility of an example of a fluorocarbon, e.g., polyvinylidene fluoride, on a two-dimensional Hansen solubility parameter diagram. Details regarding this type of solubility parameter diagram may be found in the Kirk-Othmer Encyclopedia of Chemical Technology, 2nd Ed, John Wiley & Sons, Supplement Volume, p. 889 (1971). The abscissa of the diagram represents the hydrogen bonding component of the solubility parameter, and the ordinate represents the polarity component of the solubility parameter. Both coordinates are in solubility parameter units (calories/cubic centimeter)$^{\frac{1}{2}}$. The solubility parameter at room temperature for a typical polyvinylidene fluoride is located at the center of the circle 10, and the circle representing the region of solubility has a radius of about 2 solubility parameter units. A solvent or mixture of solvents whose solubility parameter lies within the circle 10 would be considered a relatively good solvent for the polyvinylidene fluoride. Therefore, for the purposes of the present invention, the combined solubility parameter of the solvents should be outside the region of solubility for the fluorocarbon, and more particularly should be at least 2.5 solubility parameter units away from the solubility parameter of the fluorocarbon. Fluorocarbon polymers of interest in the present invention typically have a solubility parameter having a hydrogen bonding component ranging from about 4.5 to about 5.5 and a polarity component ranging from about 5.5 to about 6.5, with a similar region of solubility at room temperature having a radius of about 2 solubility parameter units. Thus the region of solubility that is to be avoided by the present invention may vary somewhat as to its location on the solubility diagram.

One of the functions of solvents in a coating composition is to reduce viscosity during the step of applying the composition to a substrate. For this purpose solvents with a high evaporation rate serve well since they are readily removed from the coating after they have served their purpose. Some rapidly evaporating solvent is useful in a roll coating composition, but not as much as used in compositions formulated for spraying, since substantial amounts of these solvents tend to cause blistering of the coating in high temperature curing ovens as are typically used on roll coating lines. Therefore, a composition intended for high temperature baking should have a solvent system that has a relatively slow evaporation rate. Spray coating compositions usually have evaporation rates greater than 70, typically above 80, and sometimes a high as about 90. In contrast thereto, the compositions of the present invention are characterized by evaporation rates less than 70, typically less than 50. Evaporation rate is measured relative to a standard value of 100 for n-butyl acetate at room temperature. Typical fast evaporating solvents are hydrocarbon solvents whose solubility parameters lie close to the origin of the solubility parameter diagram of the drawing. Since the amounts of these solvents in the composition of the present invention are limited, the region 11 on the diagram in which the solvent systems of the present invention lie is generally spaced from the origin such that the region 11 is within 4.5, preferably 4.25, solubility parameter units of the solubility parameter of the fluorocarbon. The inclusion of some fast evaporating hydrocarbon solvent(s) is desirable in the present invention in that they are poor solvents for the fluorocarbon and therefore provide viscosity reduction during application without coalescing the fluorocarbon. But after application onto the substrate, evaporation of the hydrocarbon solvent causes the combined solubility parameter of the remaining solvent mixture to shift in the direction of greater solubility of the fluorocarbon, which desirably increases coalescence of the fluorocarbon particles during the curing stage. In other words, during drying, particularly during forced drying at elevated temperature, the combined solubility parameter of the solvent system moves from region 11 toward or into region 10.

A solvent system is also expected to provide certain rheology to a coating composition of this type such that the coating will flow and level upon application onto a substrate. Compared to spray-applied coatings, roll-applied coating compositions have a more critical need for flow and leveling after application. The presence of slow evaporating solvents and relatively low amounts of fast evaporating solvents in the present invention serve this purpose.

It is also beneficial for the solvent system to contain some solvent that is relatively highly polar for the sake of aiding the coalescence of the fluorocarbon particles during the curing stage. However, the polarity component of the combined solubility parameter of the solvent combination is maintained below 5, preferably below 4.5 to avoid premature coalescence during the application stage. The presence of one or more polar solvents in the solvent combination of the present invention is offset by the inclusion of at least one solvent that is relatively low in polarity and high in hydrogen bonding, thereby yielding a combined solubility parameter that falls within the desired area 11 in the solubility diagram. Excessive amounts of solvent with high hydrogen bonding characteristics should be avoided so as to maintain the hydrogen bonding component of the combined solubility parameter below 5, preferably below 4.5.

The solvent system of the present invention comprises the combination of an ester of an aromatic acid, a ketone, an alcohol, a glycol ether ester, and a hydrocarbon. The composition is essentially free of isophorone and cyclohexanone.

Among the esters of aromatic acids that may be used are phthalates such as dimethylphthalate, dibutylphthalate, and n-butyl benzophthalate. This constituent is characterized by relatively high polarity, poor solubility of the fluorocarbon at room temperature, a coalescing effect on the fluorocarbon at elevated temperature, and a relatively low evaporation rate. This class of esters also has an additional benefit as a plasticizer. The ester of an aromatic acid may comprise 5 to 15 percent by weight of the solvent component of the composition.

Ketones are included in the composition for low initial viscosity, and therefore are chosen for relatively high evaporation rates. However, ketones with molecular weights below 100 tend to have unduly high solvency toward the fluorocarbon, and are avoided. Examples of suitable ketones are diisobutyl ketone (MW=142) and diisoamyl ketone (MW=170). The ketone may comprise 10 to 20 percent by weight of the solvent component of the composition.

The alcohol constituent of the solvent system, like the phthalates, is chosen for its slow evaporation rate, low solvency at room temperature, and coalescing effect at elevated temperature. The alcohol complements the phthalate constituent in that the alcohol is lower in polarity and higher in hydrogen bonding characteristics. However, it has been found that the alcohols that are preferred are characterized by higher polarity and lower hydrogen bonding than typical alcohol solvents. This preferred group of alcohols have exceptionally large molecular weights for alcohol solvents, the molecular weight generally exceeding 100, preferably exceeding 120, most preferably greater than 180. Partially due to this high molecular weight, the preferred alcohols exhibit extremely low evaporation rates, preferably less than 1, with one example having an evaporation rate approaching zero at room temperature. A particularly preferred class are ester alcohols such as "Texanol" from Union Carbide (2,2,4-trimethyl-1,3-pentanediol monoisobutyrate)(MW=216). Other alcohol examples that may be used include tetrahyrofurfuryl alcohol, 1-decanol, and tridecyl alcohol. The alcohol may comprise 15 to 30 percent by weight of the solvent component of the composition. In addition to relatively high molecular weight, some of the most preferred alcohols are characterized by a branched molecular structure.

The glycol ether ester constituent of the solvent is characterized by relatively low polarity and therefore low solvency toward the fluorocarbon. The glycol ether esters generally complement the ketones with regard to the solubility parameter and have lower evaporation rates than the ketones (less than 30, preferably less than 15). Glycol ether acetates are preferred, such as butyl Cellosolve ® acetate, which has an evaporation rate of 4 at room temperature. Compared to glycol ethers such as Cellosolve ®, the acetates have desirably lower viscosity and lower polarity. The glycol ether ester may comprise 20 to 35 percent by weight of the solvent component of the composition.

The hydrocarbon solvent constituent of the solvent system is present for the sake of reducing initial viscosity and is chosen for its high evaporation rate (greater than 100, preferably greater than 200). Aromatic hydrocarbons such as toluene (evaporation rate of 240) are preferred. Since the hydrocarbon solvent plays no role in the coalescence of the coating and should have poor solvency toward the fluorocarbon, it may have a solubility parameter close to the origin of the solubility parameter diagram, although some polarity and hydrogen bonding are preferred. The hydrocarbon solvent may comprise 5 to 10 percent by weight of the solvent component of the composition.

Solvents other than those described above may be present in the composition provided that they do not substantially alter the combined solubility parameter so as to fall outside the desired region 11 shown in the diagram. For example, solvents in addition to those set forth above may be present in the resins and in the tints for purposes unique thereto, and their presence in moderate amounts would usually not significantly interfere with the desired combination of properties for the solvent system of the present invention. Depending upon the particular solvents, these additional solvents may be present in amounts up to about 30 percent by weight of the total solvent component. Solvents that have been proposed for use in fluorocarbon coating compositions include: aliphatics such as petroleum distillates, mineral spirits, cyclohexane; aromatics such as xylene, naphtha, and aromatic blends such as "Aromatic 100, 150, and 200" series of solvents from Exxon; alcohols such as methanol, ethanol, propanol, butanol, and diacetone alcohol; ketones such as methyl ethyl ketone, ethyl butyl ketone, methyl isopropyl ketone, and methyl isobutyl ketone; ethers such as ethylene glycol monobutyl ether, ethylene glycol monoethyl ether ("Cellosolve" ®), diethylene glycol monobutyl ether, and diethylene glycol diethyl ether; esters such as dibasic ester, ethyl acetate, and butyl acetate.

It is to be appreciated that the specific amounts of the individual components in the coating composition as well as the types used will depend in each instance upon the particular resins as well as upon the ultimate characteristics desired for the particular coating composition end use. In addition, conventional additives for film-forming coating compositions may also be present. These additives include plasticizers, pigments, surfactants, antioxidants, ultraviolet light absorbers, stabilizers, rheology control agents, coalescing agents, curing agents, catalysts, and the like.

The resin component of the composition is in accordance with practices known to those of skill in the art for a variety of fluorocarbon containing coating compositions. In general, the pertinent resin systems are characterized by a fluorocarbon polymer dispersion and a film-forming modifying resin.

Several film forming fluoropolymers are useful in the present invention. These may include polyvinyl fluoride, polyvinylidene fluoride, vinyl fluoride copolymers, and vinylidene fluoride copolymers. The preferred film-forming fluoropolymer is a homopolymer of vinylidene fluoride. The copolymers preferably include at least 75 percent by weight, more preferably 90 percent or more, of vinyl or vinylidene fluoride units. Examples of monomers to be copolymerized with vinyl fluoride or vinylidene fluoride are ethylene, propylene, isobutylene, styrene, vinyl chloride, vinylidene chloride, difluorochloroethylene, tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate, and isopropenyl acetate, In addition fluoropolymers which contain functional groups such as those commercially available from licensees of Asahi Glass Company under the name "Lumiflon" are also suitable for use herein. Generally, the amount of fluoropolymer in the coating compositions ranges from about 45 to 85 percent by weight, preferably from about 50 to 70 percent by weight, based on the total weight of resins in the composition.

The modifying resin is a film-forming resin different from the fluorocarbon resin. The particular modifying resin may be selected in accordance with the properties which are desired in modifying the fluoropolymer. Mixtures of modifying resins may also be used. The preferred modifying resins are acrylics, and polyesters and aminoplast resins have also been suggested for this purpose. In some embodiments, inclusion of minor amounts of polyepoxide with the other modifying resin may be found useful.

The acrylic polymers employed as modifying resins in the coating composition of the present invention may be copolymers of one or more alkyl esters of acrylic acid or methacrylic acid optionally together with one of more other polymerizable ethylenically unsaturated monomers. The acrylic resin can be a thermoplastic or thermosetting acrylic resin. An especially satisfactory resin is a copolymer of methyl methacrylate and ethyl acrylate, having a molecular weight of between about 50,000 and 150,000. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other co-polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The thermoplastic acrylic resins are the polymerized ester derivatives of acrylic acid and methacrylic acid as detailed hereinafter.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as a condensate of an amine or an amide with formaldehyde such as urea, melamine, or benzoguanamine reacted with formaldehyde, or a lower alkyl ether of such condensate in which the alkyl groups contain from 1 to 4 carbon atoms. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in suitable solvents are as are known in the art. A particular acrylic resin that has been used includes n-butyl alcohol, 2-butoxyethanol and "Solvesso" ® 150 aromatic blend.

The coating compositions of the present invention may be pigmented or unpigmented, including clear coating compositions. Pigments may be present in amounts that vary in accordance with the tinting strength of the particular pigment and the covering power required for the intended use of the coating. Typically the pigment content of the composition may equal about 5 to about 60 percent by weight of the resinous binder portion. The invention is not limited to particular pigments and may include, for example, carbon black, titanium dioxide, talc, zinc oxide, magnesium oxide, and magnesium carbonate. Organic pigments and metallic pigments may also be used.

The coating composition may be formulated by admixing the resins, solvents, pigments and other components of the composition using conventional mixing equipment that is capable of providing an adequate dispersion of the pigments and any fillers in the liquid components, i.e., the binder and solvent. Following application of the coating composition to the surface to be protected or decorated, drying and/or curing of the coating is effected. The particular type and extent of the drying and/or curing will necessarily vary in each particular instance, depending upon the specific nature of the binder material which is used in the composition. Therefore, in some instances, heating may be utilized to effect drying or curing of the protective coating, while in other instances air drying or curing may prove sufficient.

The following example is illustrative of a preferred embodiment of the invention.

EXAMPLE 1

A brown pigmented coating composition for architectural components was formulated as follows:

| | Parts by Weight | |
|---|---|---|
| Resin component: | | Wt. % of Resin Component |
| Polyvinylidene fluoride[1] | 23.5 | 70.47 |
| Thermoplastic acrylic resin[2] | 8.2 | 24.48 |
| Thermosetting acrylic resin additive (optional) | 1.7 | 5.04 |
| | | Wt. % of Solvent Component |
| Solvent component: | | |
| Diisobutyl ketone | 8.9 | 16.71 |
| Texanol ®[3] | 11.5 | 21.65 |
| 2-butoxy ethanol acetate | 13.5 | 25.38 |
| Dimethyl phthalate | 5.0 | 9.48 |
| n-butyl alcohol | 0.9 | 1.67 |
| 2-butoxy ethanol | 0.5 | 0.90 |
| "Acromatic 150"[4] | 1.7 | 3.22 |
| Dibasic ester[5] | 5.4 | 10.25 |
| Toluene | 3.9 | 7.38 |
| Heavy aromatic naphtha[6] | 1.6 | 3.04 |
| Misc. solvents (xylene, water, isopropyl alcohol, methanol, ethyl acrylate) | 0.1 | 0.22 |
| Pigment component: | | |
| Titanium dioxide | 2.8 | |
| Yellow (TiO$_2$ and antimony) | 1.0 | |
| Black (cobalt/copper) | 8.1 | |
| Red iron oxide | 0.9 | |

[1]KYNAR 500 from Atochem NA, Philadelphia, Pennsylvania.
[2]35% methylmethacrylate and 65% ethyl acrylate, 40% by weight resin solids in toluene, available as ACRYLOID B44 from Rohm & Haas.
[3]2,2,4-trimethyl-1,3-pentanediol monoisobutyrate from Union Carbide.
[4]Mixed aromatic solvent from Exxon.
[5]Solvent mixture from DuPont containing 16.5 weight percent dimethyl succinate, 66 weight percent dimethyl glurarate, and 17 weight percent dimethyl adapate.
[6]83% C$_9$ or greater aromatics, 2% olefins, 15% saturated hydrocarbons from Exxon.

Before being mixed into the composition above, the pigments were separately ground using a portion of the acrylic resin and a portion of the solvents as a grind vehicle, then blended with a portion of the polyvinylidene fluoride. The resulting pigment paste was then blended with the remainder of the resins and solvents to yield the composition above. The composition was found to be successfully roll coated onto hot dip galvanized steel substrates and baked to cure in an oven with a 40 second dwell at an air temperature of 265° C. and a peak substrate temperature of 465° F. without blistering or solvent popping. The resulting cured film had a uniform, smooth appearance of the same quality as isophorone-containing compositions.

The invention has been described with reference to particular examples, but it should be understood that other variations and modifications as are known to those of skill in the art may be resorted to within the scope of the invention as defined by the claims which follow.

I claim:

1. A coating composition adapted for roll coating having a resin component that comprises fluorocarbon polymer in an amount of 45 to 85 percent by weight of the resin component and acrylic polymer in an amount of 15 to 55 percent by weight of the resin component, the improvement comprising an essentially isophorone-free solvent component comprising (on a weight basis of the solvent component):
   5 to 15 percent of an ester of an aromatic acid;
   10 to 20 percent of ketone having a molecular weight greater than 100;
   15 to 30 percent of alcohol having a molecular weight greater than 100;
   20 to 35 percent of glycol ether ester having an evaporation rate less than 30; and
   5 to 10 percent of a hydrocarbon solvent having an evaporation rate greater than 100.

2. The coating composition of claim 1 wherein the ester of an aromatic acid is an ester of a dibasic aromatic acid.

3. The coating composition of claim 1 wherein the ester of an aromatic acid is a phthalate.

4. The coating composition of claim 1 wherein the ester of an aromatic acid is dimethyl phthalate.

5. The coating composition of claim 1 wherein the ketone is diisobutyl ketone.

6. The coating composition of claim 1 wherein the glycol ether ester is an acetate.

7. The coating composition of claim 1 wherein the glycol ether ester is 2-butoxy ethyl acetate.

8. The coating composition of claim 1 wherein the alcohol has an evaporation rate less than 1.0.

9. The coating composition of claim 1 wherein the alcohol is an ester alcohol.

10. The coating composition of claim 1 wherein the alcohol has a molecular weight greater than 120.

11. The coating composition of claim 1 wherein the alcohol has a molecular weight greater than 180.

12. The coating composition of claim 1 wherein the alcohol has a branched molecular structure.

13. The coating composition of claim 1 wherein the hydrocarbon solvent has an evaporation rate greater than 200.

14. The coating composition of claim 13 wherein the hydrocarbon solvent is toluene.

15. The coating composition of claim 1 wherein the fluorocarbon polymer comprises polyvinylidene fluoride.

16. A method of coating a substrate with a fluorocarbon polymer containing coating composition comprising bringing into rotating engagement with the substrate a resilient roller, and applying to the roller a coating composition comprising a resin component that includes fluorocarbon polymer in an amount of 45 to 85 percent by weight of the resin component, acrylic polymer in an amount of 15 to 55 percent by weight of the resin component, and an essentially isophorone-free solvent component comprising (on a weight basis of the solvent component):
   5 to 15 percent of an ester of an aromatic acid;
   10 to 20 percent of ketone having a molecular weight greater than 100;
   15 to 30 percent of alcohol having a molecular weight greater than 100;
   20 to 35 percent of glycol ether ester having an evaporation rate less than 30; and
   5 to 10 percent of a hydrocarbon solvent having an evaporation rate greater than 100.

* * * * *